Feb. 3, 1970
K. KELLEY ET AL
3,493,050
METHOD AND APPARATUS FOR REMOVING WATER
AND THE LIKE FROM GAS WELLS
Filed Jan. 30, 1967
2 Sheets-Sheet 1
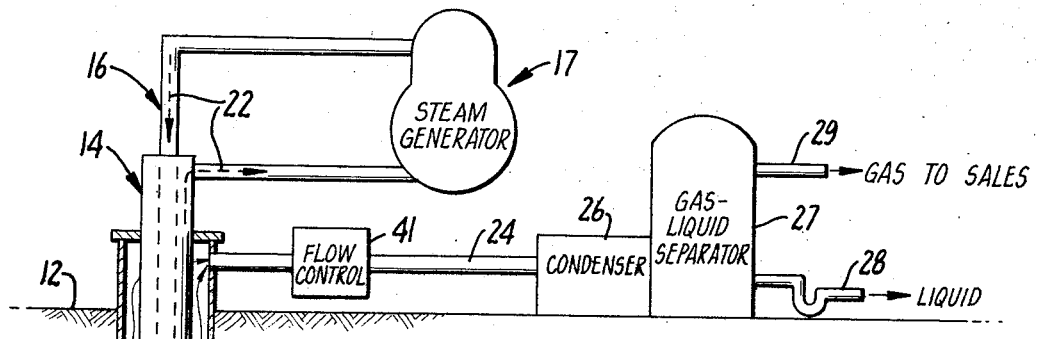
FIG. 1.
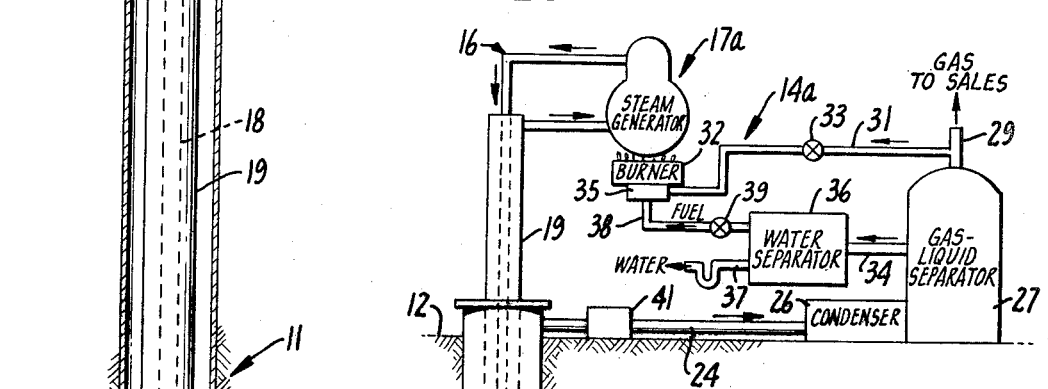
FIG. 2.
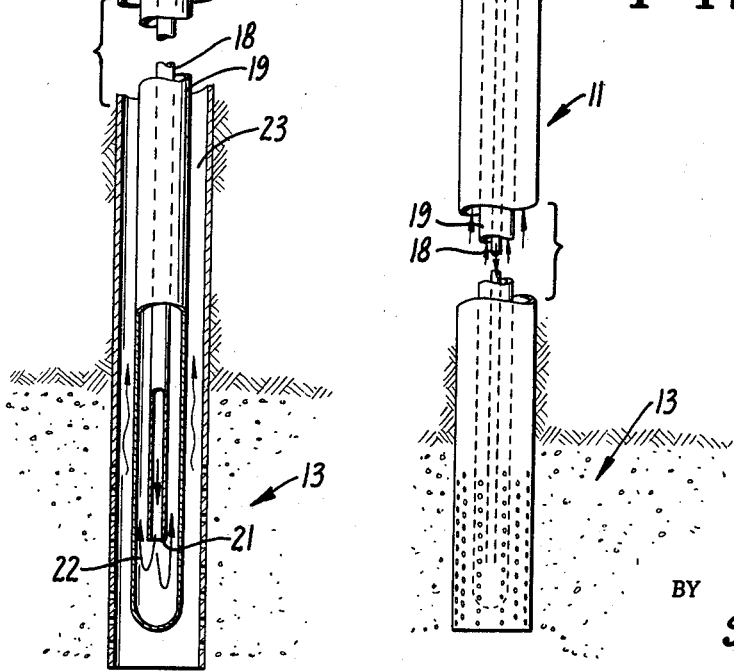
INVENTORS
KORK KELLEY
ROBERT K. KELLEY
BY
Schapp & Hatch
ATTORNEYS

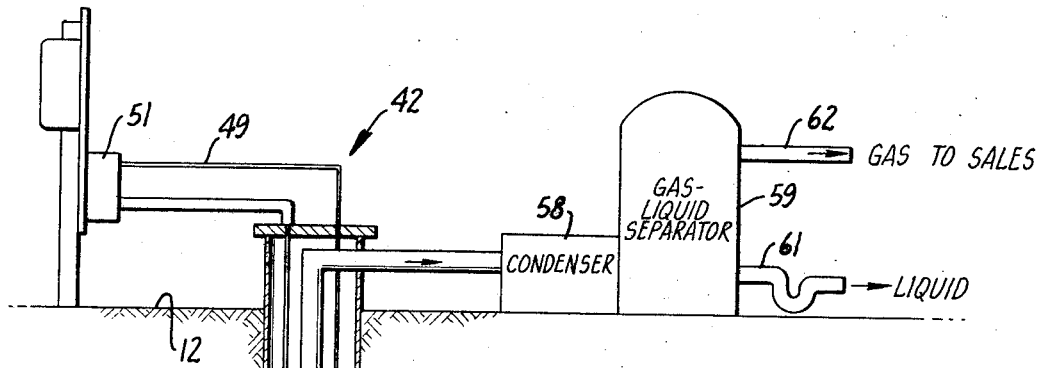
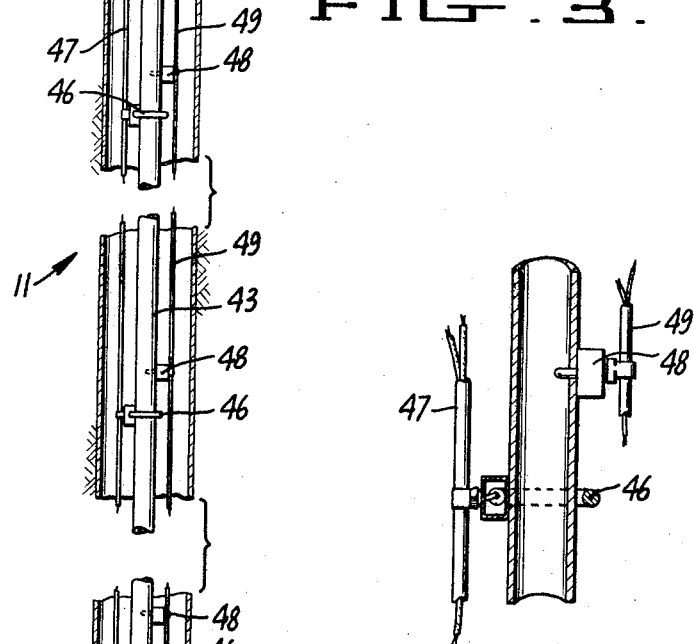
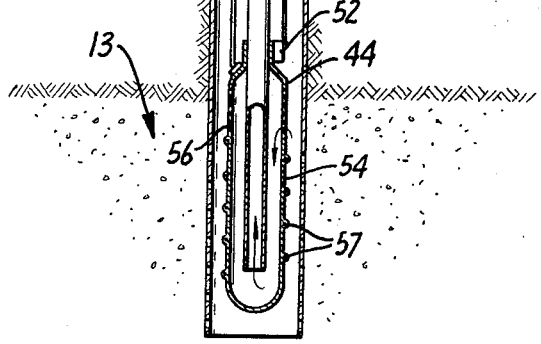

York Office 3,493,050
Patented Feb. 3, 1970

3,493,050
METHOD AND APPARATUS FOR REMOVING WATER AND THE LIKE FROM GAS WELLS
Kork Kelley, 518 W. 7th St., and Robert K. Kelley, 619 N. Pershing St., both of Liberal, Kans. 67901
Filed Jan. 30, 1967, Ser. No. 612,606
Int. Cl. E21b 43/24, 43/00
U.S. Cl. 166—267
17 Claims

ABSTRACT OF THE DISCLOSURE

This invention provides a method and apparatus for removing liquids such as water from gas wells to maintain a high level of gas production by applying heat energy to the producing zone to vaporize liquids therein, removing the vapors together with the gas produced by the well, and separating the liquids from the gas at the surface. The invention includes suitable apparatus for effecting these steps with the heat energy being controlled and typically applied from heated steam carried in a closed system or electrical heating elements.

Background of the invention

The present invention relates to a method and apparatus for removing water and the like from gas wells, and more particularly to a method and apparatus for removing liquids, such as water, from gas wells in which heat is applied to the producing zone of the well to vaporize the liquids therein.

It is well known that the accumulation of water in gas wells is a serious problem because the presence of water in the bottom of the hole prevents a natural flow of the gases to be obtained by the well. Accordingly, in order to keep such gas wells in desired operation, it is important to remove the water and prevent damaging accumulation. In addition, the presence of even small amounts of water tends to reduce the rate of production of the gas well, and it is desirable to remove all of the water, if possible.

Many systems have been developed for the removal of such water. Typical systems include pumping the water out mechanically and adding a foaming agent or soap and removing the liquid in the form of foam. However, both of these systems require an operator to control the operation and are suitable only for certain gas wells. Another system of removing water which has been eminently satisfactory for certain gas wells includes the use of liquid gas separators at the bottom of the well, such as that illustrated in United States Patent No. 2,291,902. All of these systems have certain disadvantages, however, and certain of them tend to leave sufficient quantities of water behind that the production of the gas well is not maintained at the fullest possible level.

Summary of the invention

In accordance with the present invention, it is proposed to first vaporize the liquid at the bottom of the gas well and then remove the vapors so as to provide a completely dry well and to provide a system whereby substantially complete elimination of water and the like may be achieved.

In its broad aspect, the invention contemplates the use of heat energy for vaporizing the liquid to be removed and heat energy for maintaining the liquid in vapor form as it is taken out of the well hole. This heat energy may be provided in a number of different ways, but it is preferred to utilize heating means which are separated from the producing zone by a mechanical barrier in the form of a casing or the like. In this way, it is possible to heat the well without the addition of any materials thereto.

Although it is well known to apply heat to the bottom of certain well-like structures for other reasons, so far as has been determined, it has never been proposed to add heat to the producing zone of a gas well for the purpose of deliquefying the well and keep the desired high rate of production therein. It might appear at first blush that the use of heat for such a purpose would require an undue expense, but it has been found, quite surprisingly, that this system is comparatively inexpensive, and has an advantage over the present methods of solving this problem.

Accordingly, it is the primary object of this invention to provide a method and apparatus for removing water and other liquids from gas wells in which the water or other liquid is vaporized at the producing zone then removed in vapor form from the well together with the gas produced by the well, and then condensed from the produced gas flow to provide a comparatively dry gas product.

Another object of the invention is to provide a method and apparatus for removing water and the like from gas wells, in which the producing zone of the gas well is kept at a very high state of dryness.

A further object of the invention is to provide a method and apparatus for removing water from gas wells, which is suitable for both shallow and deep wells and for wells having a rather large range of natural pressure therein.

Still another object of the invention is to provide a method and apparatus of the character described, which is simple in construction, economical in both construction and operation, and absolutely reliable.

Further objects and advantages of the invention will be apparent as the specification progresses and the new and useful features of the method and apparatus for removing water and the like from gas wells will be fully defined in the claims attached hereto.

In its method form, the invention provides for dewatering gas wells by the steps of applying sufficient heat at the bottom of the well to vaporize the water and/or other liquid therein, applying sufficient heat to the stream of vaporized water and other liquid in the gas stream as the stream proceeds up the well bore to keep the liquids in a vaporized state, and condensing the water and other liquids out of the gas after they leave the well. The heat should be applied in a controlled manner in order to avoid the use of unduly high temperatures. It will be appreciated, however, that the exact heating temperatures utilized will depend upon the pressures within the well, and that the temperature should exceed the boiling point of water or the liquid being removed at the pressure within the producing zone. By the same token, the temperature should exceed the boiling point of the liquids removed all of the way up through the well so that the liquids will remain in a vapor state. However, it will be appreciated that as the material moves upward into more shallow positions in the well, the pressure will become lower and so will the boiling point of the liquids being removed. This characteristic of gas wells will assist to some extent in the problem of maintaining the vapors above the boiling point as they are removed from the well. In some cases, it may be desirable to provide mechanisms for achieving pressure reduction throughout different zones as the vapors leave the well, and where sufficient pressure reduction is achieved, it is not necessary to apply auxiliary heat to the vapors during their egress from the well.

As mentioned above, the temperature should be above the boiling point of the liquid removed at the working pressure, but elevated temperatures should be avoided in order to prevent or reduce the occurrence of undue chemical reactions in the producing zone of the well. In general, the temperature will be preferably maintained at value between the boiling point of the liquid to be removed and a temperature of, say, about 100° C. above the boiling point of the liquid to be removed. A certain amounts of superheat is desirable in the vapors, however, in order to assist in the prevention of condensation during egress of the vapors from the well.

In order to positively assure the desired temperatures in the zones of the well, it is proposed to utilize typical measuring devices, such as thermocouple pyrometers for determining the temperature in the desired control zones. In some cases, it may also be desirable to provide certain pressure sensing devices to be utilized in combination with the temperature sensing devices. This data then is utilized to control the input of heat to the various zones through the mechanism utilized in this invention for applying heat. Preferably, the controls are tied in to the other elements of the apparatus utilized to provide a completely automatic operation. In other words, the control devices could be any of the usual thermostat control devices used for automatic heating. In this way, the dryness of the well is positively assured, while at the same time excessive temperatures are avoided.

Another feature of this invention resides in the use of heating means, such as steam or electrical heat, which does not add any material to the well in the producing zone or otherwise. This maintenance of natural conditions is important in order to avoid chemical reactions which might take place under the influence of high temperature steam and/or other heating media in the environment of the producing zone. It also has the advantage of maintaining the well production in its natural state and minimizing the necessity for subsequent separation of unwanted materials from the gas product to be sent to the consumer.

In a preferred form of the invention, the heat energy utilized for providing the heat in the well is obtained by burning combustible materials taken from the well and, in some cases, combustible liquids that are removed from the gas produced by the well and separated in accordance with the invention. By utilizing the energy taken from the well and automatic controls, it is possible to provide a completely integrated system which is absolutely reliable in operation, as well as being automatic and inexpensive. In addition to the advantages achieved by maintaining the removal of liquid from the well, it is believed that by heating the rock formations around the producing zone, better gas production may also be achieved by wells which are worked in accordance with the present invention.

In its apparatus form, the present invention provides an apparatus for removing water and the like from the producing zone of gas wells comprising heating means located in the producing zone for providing heat energy to the producing zone and vaporizing the water and other liquids therein, together with a gas-liquid separator such as a condenser at the surface for removal of water and other liquids from the gas stream from the well, said heating means being formed with a casing or the like to provide heat through the wall thereof and heat the liquids in the producing zone. In general, any heating means which will provide heat in this manner is suitable, and typical examples include the use of electrical heating elements and steam pipes disposed within the well.

When steam pipes are utilized, it is preferred to extend a string of concentric pipes down into the well hole and add fresh superheated steam through the central pipe while bringing out the lower temperature steam through the annular space between the pipes and recycle back through a boiler. It is important to provide superheated steam in an amount and at a sufficient superheated temperature to prevent condensation of such steam and accumulation of water at the bottom of the steam pipes in the well. Such an accumulation is prevented by utilizing accurate temperature controls.

It will also be appreciated that the concentric arrangement of steam pipes provides for heating of the well bore throughout its entire length, so that the vaporized liquids from the producing zone will remain in the vapor state as they are taken from the well at the surface. In some cases, liquid hydrocarbon materials, or hydrocarbon materials to be separated from the ultimate produced gas will be taken from the well and separated from the produced gas by a condenser and/or other separating means. In such cases, it is preferred to utilize this combustible material to fire the boiler. If an insufficient amount of this material is available for this purpose, then it may be desirable to utilize some of the gas produced from the well. Control of the boiler is automatically maintained by regulating the burners from temperature control elements located within the well in accordance with known methods for automatically controlling boilers and steam output according to demand.

It will also be appreciated that other fluid materials could be used in place of steam. For example, certain liquids known as heat transfer media such as Dowtherm A could be used.

When water is to be removed by electrical heating, it is preferred to provide a plurality of heating elements throughout the length of the well, but with the larger and heavier capacity elements at the producing zone where the liquids must be vaporized. In the other zones, smaller elements may be used because it is only necessary to maintain the material in vaporized state. These elements are preferably controlled separately in accordance with temperature responsive means located in areas close to each particular element.

Where electrical energy is used, it usually will be more convenient to utilize the energy from the fuel taken from the well to generate electricity. However, it will be appreciated that in other cases, as where the well is far removed from power lines, it may be desirable to utilize materials taken from the well to operate a gas fired or liquid hydrocarbon fired engine, which in turn would drive a generator and provide the desired power. Once again, such a system could be automatically controlled with known control devices.

As an important feature of this invention, the initial separation of liquids from the produced gas is effected at the well site. Where water is removed from the well, a simple condenser may be utilized to condense the water out of the produced gas stream by any of the known industrial condensers. In many areas, water taken out of the produced gas stream may be cooled by utilizing ordinary spray towers and the cool water reused in the condenser itself.

Where it is desirable to remove low-temperature hydrocarbons, it may be desirable to maintain or even increase the pressure of the gas through the condenser and condense out low-boiling liquids by any of the well known procedures for such low-boiling hydrocarbon removal. As indicated above, where such low-boiling hydrocarbons are available, it may be desirable to utilize them as an energy source for providing the heat energy required by the method and apparatus of this invention.

Brief description of the drawings

The prefered forms of the invention are shown in the accompanying drawings forming a part of this description, in which:

FIGURE 1 is a diagrammatic view illustrating a typical gas well equipped with an apparatus constructed according to the invention, in which steam is utilized for removing the liquid from the producing zone and well;

FIGURE 2, a diagrammatic view illustrating a typical fully integrated steam system, in which the well itself is used to supply the energy for operating the apparatus illustrated in FIGURE 1;

FIGURE 3, a diagrammatic view showing a typical gas well equipped with an apparatus constructed according to the invention, in which electrical energy is utilized for heating the gas well; and FIGURE 4, an enlarged view of a portion of the well shown in FIGURE 3 illustrating in greater detail how the control device and heating elements may be placed within the well casing.

While only the preferred froms of the invention are shown, it should be understood that various changes or modifications may be made within the scope of the claims attached hereto without departing from the spirit of the invention.

DESCRIPTION OF THE PREFERRED EMBODIMENTS

Referring to the drawings in greater detail and more particularly to FIGURE 1, there is shown a gas well bore 11 extending downwardly from the ground surface 12 and including a producing zone 13 at the bottom thereof. The well is equipped with an apparatus for removing water and other liquids 14, which generally comprises a steam pipe assembly 16 extending from an area located at or near the surface of the ground through the well 11 and into the producing zone 13 thereof, and means 17 for supplying steam to the steam pipe assembly.

The steam pipe assembly comprises a pair of concentrically disposed pipes 18 and 19 with pipe 18 fitting within pipe 19 and terminating with its end 21 disposed within the pipe 19 where the pipe 19 extends into the producing zone of the well and preferably near the bottom of the well. The means for providing steam 17 is constructed to provide steam into and through pipe 18 as indicated by arrows 22 with the flow of steam being downward through pipe 18, out of pipe 18 and into the bottom of pipe 19, and thence upward through pipe 19 and back through the means for supplying steam where it is heated and recycled. In general, the means for supplying steam may be a typical steam boiler or steam plant, as indicated in the drawings, with the boiler being fired by any suitable fuel material. The boiler is regulated by conventional means to supply only superheated steam in accordance with usual procedures, and suitable controls may be provided for assuring that all steam is recycled and none of it condensed and trapped at the bottom of the well. In this way, the apparatus operates at its best efficiency.

The gas is produced in the producing zone in the conventional manner, but in addition to the gas produced there is vaporized material which would otherwise be accumulated liquid in the bottom of the well. This vaporized liquid will usually contain water and/or liquid hydrocarbon or other materials. The vapors produced by the well are drown out through the annular space 23 and passed through a pipe 24 to a condenser 26 and a gas and liquid separator 27 where the normally liquid materials are condensed and removed through liquid line 28 while the gas produced goes through gas line 29 to sales.

In general, the condenser and gas liquid separator may be any device suitable for the purpose which will operate automatically, and many of such devices are available commercially. A particular unit selected will, of course, depend upon the nature of gases and liquid materials removed from the well. For example, where the materials removed from the well consist of gas suitable for sales and water only, it is a rather simple matter to condense and separate the water from the gas stream.

In the embodiment shown in FIGURE 1, it is assumed that the fuel energy for the steam generator may be any suitable fuel supplied in accordance with usual procedures. However, it will be appreciated that the well itself is a source of fuel and that gas taken from the well could be used to fire the boiler if desired. In FIGURE 2, there is shown a completely integrated system in which the fuel for suppling heat to the apparatus is taken from the well either in the form of liquid hydrocarbons taken therefrom, gas taken from the well, or both.

Referring to FIGURE 2 in greater detail, there is shown a gas well 11 similar to that shown in FIGURE 1 with the well hole extending from the ground level 12 to the producing zone 13 in a conventional fashion. The well is equipped with an apparatus 14a which contains a steam pipe assembly 16 consisting of concentric pipes 18 and 19 and disposed similarly to the apparatus of FIGURE 1, but supplied by modified steam generating means 17a. The gas which is produced from the well is drawn out through a pipe 24 and passed into a condenser 26 and there to a gas liquid separator 27, with the gas being drawn off to sales through line 29 as in the embodiment of FIG. 1.

However, the embodiment of FIGURE 2 utilizes the fuel from the gas well 11 as an energy source, and the diagram here shown explains how the fuel is used for various types of gas wells. For example, where the liquid is substantially all water, gas is used to fire the burner by taking gas from the sales line through line 31 and over to the burner 32. Line 31 is equipped with a suitable valve 33 which is controlled by thermostatic controls 35 so as to produce the desired amount of superheated steam. The whole operation works automatically and is as reliable as a household hot water heater. Any suitable type of thermostatic control may be used.

Where the liquid from the well contains combustible hydrocarbons and water, the liquid from the separator 27 is directed through line 34, which leads to water separator 36, where the lighter immiscible hydrocarbon liquids form out in the upper portion and the water forms in the lower portion, much as in the conventional separatory funnel. The water is then drawn off from the lower portion of the separator through waste pipe 37 and the liquid fuel is passed to the burner 32 through line 38.

Where the well provides sufficient liquid fuel to meet the requirements of the steam generator, a control valve 39 is placed in the liquid line and operated under thermostatic control, while the valve 33 is shut off so that none of the gas is utilized in the burner. Where more liquid fuel is provided than is needed, it will either go out with the waste water or it can be collected by allowing it to pass out through a suitable overflow (not shown). The hydrocarbon-water separator should be equipped with suitable controls such as a float valve at the interface to shut off the liquid fuel line when the liquid fuel becomes inadequate in order to prevent water from being passed on to the burner. Such a system may be tied in with the valve 33 so as to allow both gas and liquid hydrocarbons to fire the steam generator.

In both the embodiment shown in FIGURE 1 and that shown in FIGURE 2, the steam is passed down into the well hole through the central concentric pipe in order to retain the steam in a heated condition and supply superheated steam in the producing zone. The steam thus entering the producing zone through pipe 18 gives up its superheat, or most of it, and passed back up through the annular space between pipes 18 and 19. In its passage back, the steam will tend to pick up some heat from the entering steam and to give up some heat to the surrounding bore formation. In this way, the liquid evaporated in the producing zone is retained in the vapor state as it is drawn out through the well.

It is also seen that the steam heating system is preferably a closed system so that the steam used is continuously recycled. In this way, the usual need for makeup water and accompanying scale problem is reduced or eliminated.

In operation, control of the system is rather important and this control will depend to some extent on the pressure within the well. However, it will be appreciated that the pressure within the well can be regulated by inserting a pump or other flow control element 41 in pipe 24. The heat demand to the boiler may be regulated by thermostats placed in the producing zone and along the well formation as in the embodiment of FIGURES 3 and 4 explained hereinafter, or by placing such elements in the stream of the returning steam line to determine the charcteristics thereof. The important consideration is to maintain the steam temperature high enough that the liquids are evaporated from the producing zone, without collecting condensate at the bottom of the steam pipe assembly 19 in the producing zone.

From the foregoing description, it is seen that a completely integrated steam heating system may be provided or positively removing water and other liquids from gas wells to maintain the desired high production thereof. It is also believed that by utilizing the present invention that the heated formation in the vicinity of the producing zone and possible pressure controls will assist in maintaining a high level of gas production.

In FIGURE 3, there is shown another form of apparatus constructed according to the invention in which electrical energy is utilized to provide the heat. Referring to FIGURE 3 in greater detail, there is seen a typical gas well 11 extending from the ground 12 to a producing zone 13, with the well being similar to that shown in the embodiment of FIGURES 1 and 2. However, an electrical apparatus 42 is provided for supplying heat to the producing zone 13.

This apparatus 42 comprises a producing pipe 43 extending down into the producing zone 13 of the well 11, a main electric heater 44 located around the lower end of pipe 43 in the producing zone of the well, auxiliary heaters 46 for heating the pipe 16, if necessary or desirable, and wires 47 leading to a suitable source of electric energy. As here shown, suitable temperature measuring devices 48 are placed along the well stream in close position to the various electrical heaters. These measuring devices have lead wires 49 going back to master thermostatic control element 51. In this way, the temperature to the various auxiliary heaters may be controlled individually as needed. In addition, a temperature measuring device 52 is provided for measuring the temperature in the producing zone and this control device has wires 53 leading to and becoming a part of cable 49.

Although the control elements are shown with wires leading back to master control element 51, it will be appreciated that individual thermostats could be set for each burner and thereby simplify the wiring. However, the present circuitry allows for manual adjustment of the thermostats in the master control element 51, so that different heating conditions may be provided, if desired, without the need for pulling the pipe 48 out of the well.

In general, any form of heating element may be used such as the typical Calrod elements, and elements of this sort are particularly suitable for the auxiliary heaters. With respect to the main electric heater 44, it is proposed to provide a casing 54 which completely surrounds the end of the pipe 43, with the casing 54 having suitable perforations 56 for allowing gas and vapor to enter the pipe 43. The casing 54 has suitable heating elements 57 disposed therethrough so as to keep the whole casing hot and thereby maintain the desired temperature in the producing zone.

With this arrangement, it is possible to keep the producing zone substantially dry, i.e., not only are water and other liquids kept from the producing zones, but the perforations in the casing at the bottom and the areas nearby are kept in heated condition for allowing easier movement of gas into the producing zone itself.

The gas taken from the well through pipe 43 will often contain water and/or other liquids. Therefore, the pipe 43 is connected to condenser 58, which in turn is connected to gas-liquid separator 59. The gas and liquid are separated in the separator 59 with the liquid being drawn out through waste line 61, and the gas removed through line 62.

In operation, the thermostats of the master control element 51 are set so as to fix the desired temperatures in various zones and in the producing zone. The temperatures are such that the liquid likely to accumulate in the producing zone will be vaporized, and the liquids so vaporized will remain in vapor form as they leave the well. The device is then simply turned on and it will operate automatically so long as electric energy is supplied the system.

For this reason, it is proposed to utilize regular utility line power for the energy source in this embodiment. However, it will be appreciated that an auxiliary power plant could be set up, and that this power plant could operate from a gas or liquid hydrocarbon engine driving a generator with either the gas or liquid hydrocarbon taken from the well, as described above for the embodiments of FIGURES 1 and 2.

It will be appreciated that the system is rather simple in construction and suitable for practically any gas well regardless of size and operating pressures. In this way, gas wells which were heretofore difficult to maintain in proper operation, or which had to be closed down because of water accumulation can once again be operated at full capacity.

We claim:

1. An apparatus for removing water and the like from a gas well having a producing zone at the bottom thereof, wherein the improvement comprises heating means including a heater located in the gas well at the level of the producing zone for providing heat energy to the producing zone and vaporizing substantially all of the water thereat, and a condenser at the surface for removal of such water from the gas stream removed from the well, said heater having an outer casing and being formed to provide heat through said casing to heat and vaporize the water in the producing zone.

2. The apparatus defined in claim 1, in which control means are provided to regulate the supply of heat to the producing zone for providing sufficient heat to maintain the temperature of the producing zone above the boiling point of water at the pressure in said zone while at the same time avoiding excessive temperatures.

3. The apparatus defined in claim 1, in which heating means are provided throughout the length of the well hole to maintain the temperature of the medium therein high enough to prevent condensation of materials within the well.

4. The apparatus defined in claim 1 which also comprises means for separating liquid hydrocarbons and like combustible materials from the normally liquid material removed by the condenser, and means are provided to supply said hydrocarbons and like combustible materials to the heating means.

5. The apparatus defined in claim 1, in which said heater comprises an enclosed electrical heating element disposed within the well.

6. The apparatus defined in claim 1, in which the heating means comprises a boiler and a pair of steam pipes extending down into the well to the producing zone, said pipes being formed with a cycling passage therein for directing live steam from the boiler to the producing zone and returning used steam to the boiler.

7. An apparatus as described in claim 1 for removing water from gas wells having a well casing, a producing zone at the bottom thereof, and a producing line in communication with said casing; wherein said heating means comprises a pair of pipes extending from a position at the top of the well to a position at the producing zone thereof, said pipes being in communication with each other at the producing zone to provide said heater, the interior of said pipes being sealed from the produced gas within the well casing, means for supplying fluid to one of said pipes whereby the fluid flows down one of said pipes and back through the other, and heat supply means at the top of the well for heating said fluid.

8. The apparatus defined in claim 7, in which the pair of pipes are disposed in concentric relation with the heated fluid being supplied through the center pipe and the used fluid returning through the annular space between the pipes.

9. The apparatus defined in claim 8, in which the fluid utilized is water, and the heat supply means is a boiler heated by a combustible fuel formed to deliver superheated steam.

10. The apparatus defined in claim 9, in which means is provided for taking the fuel utilized for providing the superheated steam from the gas well itself.

11. A method of removing water and the like from gas wells comprising the steps of applying heat to the producing zone of the well to vaporize the water coming into said zone, removing the gas and vaporized water from the well, separating the vaporized water from the gas at the surface of the well, and applying sufficient heat to the stream of gas and vaporized water as it leaves the well formation to retain the water in a vapor state.

12. A method for removing water and the like from gas wells defined in claim 11, in which a temperature of the producing zone and other zones of the gas well is maintained in the range of from the boiling point of water at the pressure in said producing zone to about 100° C. above said boiling point.

13. A method of removing water and the like from gas wells as defined in claim 12, in which the heat is obtained by utilizing electrical energy, and transferring said electrical energy into heat in the amount desired in the various zones throughout the length of the well.

14. A method of removing water and the like defined in claim 11, in which the heat is supplied by recycling superheated steam through a closed steam pipe system extending down through the well and through the producing zone thereof.

15. The method of removing water and the like defined in claim 14, in which the steam is generated by burning combustible materials taken from the gas well with the generation of steam being controlled in accordance with the requirements for retaining a sufficient temperature in the well with automatic controls.

16. The apparatus defined in claim 5, which also comprises an electric control circuit operatively connected to control the energy to the heating element, and a series of temperature measuring devices extending throughout the length of the well formed for operating the control circuit in response to the measured temperatures within the well.

17. The apparatus defined in claim 16, which also comprises a production line having an opening at the end thereof in the producing zone, and a perforated casing surrounding the opening in said production line, said heating element being mounted on said perforated casing.

References Cited

UNITED STATES PATENTS

| | | | |
|---|---|---|---|
| 1,414,171 | 4/1922 | Booth | 166—60 |
| 760,304 | 5/1904 | Butler | 166—61 |
| 782,233 | 2/1905 | Gardner | 166—61 X |
| 1,140,982 | 5/1915 | Huff. | |
| 1,327,906 | 1/1920 | Cross. | |
| 1,342,741 | 6/1920 | Day | 166—8 |
| 1,358,393 | 11/1920 | Rathvon | 166—57 |
| 1,934,955 | 11/1933 | Thrupp | 166—60 |
| 2,647,585 | 8/1953 | Roberts | 166—61 |
| 2,725,939 | 12/1955 | Belser | 166—6 X |
| 3,070,178 | 12/1962 | Graham et al. | 166—39 X |

OTHER REFERENCES

Uren, Lester C.: Petroleum Production Engineering: Oil Field Exploitation, New York, McGraw-Hill, third edition, 1953, p. 600.

CHARLES E. O'CONNELL, Primary Examiner

IAN A. CALVERT, Assistant Examiner

U.S. Cl. X.R.

166—60, 302